UNITED STATES PATENT OFFICE 2,425,504

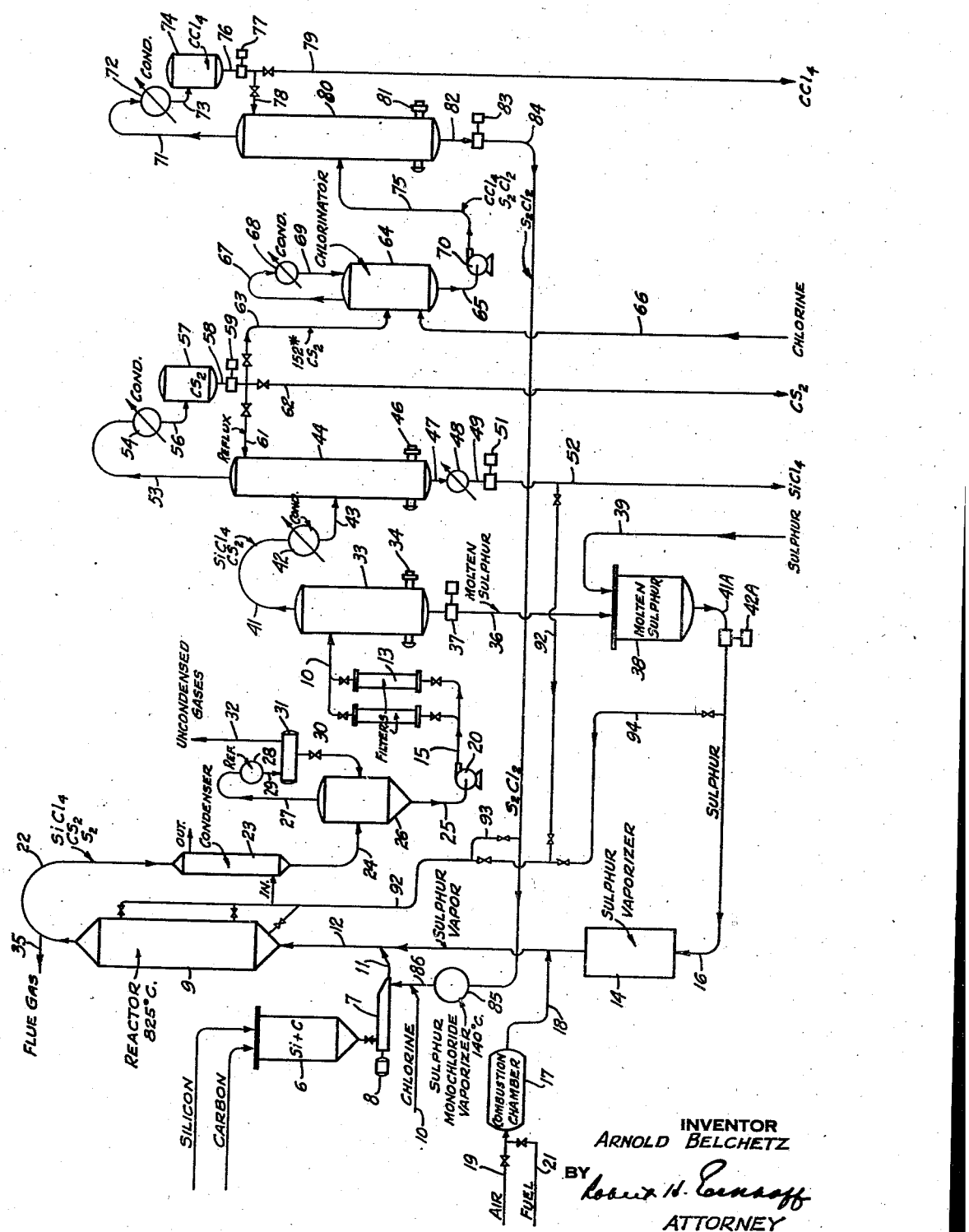

MANUFACTURE OF SILICON TETRACHLORIDE AND CARBON DISULPHIDE

Arnold Belchetz, Larchmont, N. Y., assignor to Stauffer Chemical Company, a corporation of California Application December 29, 1945, Serial No. 637,884

8 Claims. (Cl. 23—205)

The present invention relates generally to the manufacture of silicon tetrachloride, carbon bisulfide and carbon tetrachloride. It is particularly concerned with a method for the simultaneous production of silicon tetrachloride and carbon tetrachloride in a continuous, unitary process, involving the formation of carbon bisulphide at an intermediate stage.

One of the commonest methods of preparing carbon tetrachloride is by the chlorination of carbon bisulphide, the reactions being essentially as follows:

(1) $\quad 2CS_2 + 6Cl_2 \rightarrow 2CCl_4 + 2S_2Cl_2$
(2) $\quad CS_2 + 2S_2Cl_2 \rightarrow CCl_4 + 6S$ The net reaction is thus:

(3) $\quad 3CS_2 + 6Cl_2 \rightarrow 3CCl_4 + 6S$

Reaction (1) proceeds quite readily and efficiently, but reaction (2) has proven a source of considerable difficulty in that when sulphur monochloride is reacted with a large excess of carbon bisulphide, even in the presence of a catalyst, appreciable amounts of the sulphur monochloride still exist and tend to remain with the by-product sulphur. The latter must be utilized to full advantage as a by-product to make the process commercially feasible as a whole, yet the presence of small amounts of sulphur monochloride in the recovered sulphur greatly reduces its value for most purposes. Hence, it is necessary to employ air-blowing, steaming, and similar operations to make the by-product sulphur saleable, and these operations are expensive and troublesome. It is not feasible to dispose of the sulphur monochloride from the first reaction as such, as the quantities produced exceed the commercial demand and the sulphur monochloride obtained is not completely pure. The chlorine remaining in the sulphur monochloride must obviously be converted to carbon tetrachloride, if carbon tetrachloride is to be produced cheaply—hence the necessity for an operation corresponding to the second reaction.

In addition to the above described difficulties in making carbon tetrachloride from carbon bisulphide, the manufacture of the starting material, carbon bisulphide, is also beset with serious problems. Carbon bisulphide is usually made directly from reactive forms of carbon and sulphur, the carbon being brought into contact with sulphur vapor at a temperature of about 1300° F. or higher. To obtain practical rates of reaction in commercial operation, it is customary to utilize reaction temperatures of about 1500° F. Owing to the very large amount of heat required to superheat sulphur vapor to this temperature and the difficulty of doing this in a pipe coil or other efficient heat-exchanging apparatus, owing to the extremely corrosive properties of sulphur vapor at high temperatures, the manufacture of carbon bisulphide has heretofore been accomplished chiefly by what is essentially a batch-wise operation in cast iron or carborundum retorts or similar apparatus of low thermal efficiency. The relatively high cost of manufacture of carbon bisulphide adds to the cost of producing carbon tetrachloride.

Silicon tetrachloride is a material for which there is a growing demand, and silicon tetrachloride manufacture from metallic silicon, ferrosilicon, or silicon carbide (carborundum) has been hampered by a technical difficulty substantially the opposite of that encountered in the carbon bisulphide manufacturing process; namely, that very large amounts of heat are produced during the reaction, and that only refractory lined vessels, poorly adapted to the dissipation of heat, have been found capable of withstanding the corrosion. A typical reaction for the formation of silicon tetrachloride is as follows:

(4) $\quad Si + 2Cl_2 \rightarrow SiCl_4$ in which silicon in the form of ferrosilicon or metallic silicon is chlorinated with the liberation of a large amount of heat.

One of the important features of my invention takes advantage of the fact that silicon apparently has a much greater affinity for chlorine than have either carbon or sulphur, and that the affinity of silicon for chlorine is greater than its affinity for sulphur. I have discovered that if there is present in a reaction zone at one time a quantity of silicon, accompanied by just sufficient chlorine to convert all the silicon present into silicon tetrachloride; and if there are also present amounts of carbon and sulphur in the proper proportion for the formation of carbon bisulphide, then the simultaneous formation of silicon tetrachloride and carbon bisulphide can be achieved at a suitable reaction temperature. Contrary to what might be expected, there is negligible formation of silicon sulfide or disulphide or of sulphur chloride. However, this result will not ensue if there is present any excess of silicon above that required to combine with the chlorine, or if there is excess chlorine. If there is present an excess of silicon, the sulphur will preferentially react with this excess silicon rather than with the carbon, so that silicon sulfide will be formed instead of carbon bisulphide. Although the affinity of silicon for chlorine is much greater than for sulphur, its affinity for sulphur is much greater than that of carbon for sulphur, and at high temperatures, of the order of 1500° F., it has been found that silicon will actually take sulphur from carbon bisulphide to form silicon disulphide and carbon. On the other hand, if any excess of chlorine over that required by the silicon is present, sulphur will react with this excess chlorine to form sulphur monochloride instead of reacting with carbon to form carbon bisulphide. The sulphur and chlorine requirements for a reaction system of the character just described may be quite readily satisfied entirely or in part by the introduction of sulphur monochloride, such as is obtained as an intermediate or by-product in the chlorination of carbon bisulphide to form carbon tetrachloride. Silicon and carbon selectively take the chlorine and sulphur from the sulphur monochloride so that this material can be utilized in the process and does not provide any special problem as heretofore.

A further important feature of the invention is therefore the method I have discovered of maintaining the necessary stoichiometric proportionality between the silicon and chlorine present in the reaction zone and of maintaining the reaction zone at a suitable temperature without use of extraneous heat. This method involves subdividing the silicon source material and the carbon source material (which may, if desired, be provided by one material, as silicon carbide) and suspending them in the reactor by means of the introduced requisite quantities of chlorine and sulphur vapor. The finely divided feed material is continuously introduced into the reactor as a flowing suspension in one or both of the gaseous reactants, at a moderate non-reacting temperature, and both the solid and gaseous reactants are substantially instantaneously heated to a reacting temperature by convection and conduction from a mass of fluidized material already present in the reaction zone. Thereafter, the heat required to continue the process, as additional quantities of reactants are introduced, is supplied by the heat evolved in the formation of silicon tetrachloride from the silicon and chlorine.

The amount of heat needed to balance the requirements of the process will depend upon the relative amounts of silicon tetrachloride and carbon bisulphide produced. By allowing them to be formed in the reactor in the proper ratio, a substantially exact balance can be reached such that heat need not be supplied to the reactor from an extraneous source; i. e., the reaction can be made adiabatic. This heat-balancing feature is an especially important element of my invention for it enables the carbon bisulphide to be produced without any difficult heat input problem and silicon tetrachloride to be produced under such conditions that the relatively great exothermicity of the reaction does not present a problem.

At the preferred operation temperature of about 1520° F. for the conjoint and simultaneous formation of silicon tetrachloride and carbon bisulphide, the equilibrium for the reaction (5) 

is such that only about 91% of the sulphur introduced into the reactor is converted to carbon bisulphide in the presence of excess carbon. The unreacted sulphur, silicon tetrachloride and carbon bisulphide leaving the reactor as reaction products are readily separated, e. g., by fractionation. Thereafter, all or a portion of the carbon disulphide may be chlorinated to carbon tetrachloride with simultaneous formation of sulphur monochloride. This is separated from the carbon tetrachloride and is returned to the reactor. Depending upon the quantity of carbon bisulphide being chlorinated, the sulphur monochloride can provide all or part of the sulphur required for production of carbon bisulphide and all or part of the chlorine required for production of silicon tetrachloride.

Conventional batch methods, in which a large quantity of silicon is charged to a reactor and is gradually converted to silicon tetrachloride by the passage of a stream of chlorine therethrough, are quite unsuitable for the joint production of silicon tetrachloride and carbon bisulphide. Thus if a mixture of silicon and carbon is charged to a batch reactor and a mixture of chlorine and sulphur vapor passed therethrough, the silicon mass in the furnace will be in great excess over the chlorine quantity present at any given instant so that silicon disulphide will be formed in addition to silicon tetrachloride, with little, if any, formation of carbon bisulphide. When the silicon is exhausted from the bed, a large quantity of unreacted carbon will remain, with no heat available to convert the carbon to carbon bisulphide.

The principal object of my invention is to surmount the aforementioned difficulties, to provide an economical, continuous and easily-managed unitary process for the simultaneous manufacture of silicon tetrachloride and carbon bisulphide and, if desired, the conversion of all or part of the latter into carbon tetrachloride. More specifically, one of the important objects of the invention is to afford a method for the conjoint formation of silicon tetrachloride and carbon bisulphide in which the exothermic heat of the former and the necessary preheating of the sulphur for the latter are made mutually advantageous, each serving to remedy the difficulties occasioned by the other.

A further object of my invention is to provide a process for manufacturing silicon tetrachloride and carbon tetrachloride from silicon, carbon and chlorine wherein the heat required to be transferred from and to the reactants are substantially less than in prior known processes, and wherein sulphur and halogenated-sulphur by-products resulting from the intermediate formation and chlorination of carbon bisulphide are continuously returned to the process.

Still another object of the invention is to provide an effective method of continuously producing silicon tetrachloride simultaneously in a common reaction zone. The invention has other objects and produces other results of advantage which, together with the foregoing, will more fully appear from the detailed description of the invention hereinafter given.

In the drawing accompanying and forming a part hereof, the single figure is a diagrammatic representation of suitable apparatus which can be employed, and a flow sheet. Referring now to the drawing, and by way of explanation of suitable equipment which can be employed to carry out the process of my invention, vessel 9 is an elongated, vertically extending reactor, preferably lined with refractory in which the joint formation of silicon tetrachloride and carbon bisulphide is to take place. The materials to be reacted are fed into the reactor through line 12. The solids are preferably placed in hopper 6 as a uniform mixture, and are withdrawn from this by the screw pump on feeder 7 driven by motor 8. The solid reactant materials emerging from the solids pump 7 into line 11 are picked up in gaseous suspension by a stream of sulphur monochloride vapors entering through line 86, the latter being derived from a subsequent step of the process. In starting up the process before any sulphur monochloride has been produced, chlorine may be introduced into line 86 through line 10 and used to suspend the solids. The suspended materials next enter line 12 where they join a stream of sulphur vapors being generated in a vaporizer 14.

In order to establish suitable operating conditions in the reactor 9 and to place the process in operation, a quantity of carbon is initially introduced into reactor 9. This initial charge is heated to or above the chosen reaction temperature by passing hot flue gas, or any other heated inert gas which may be available, through line 12 into reactor 9, thence into line 22 and releasing it through line 35. A combustion chamber 17 for generating a suitable hot inert flue gas is connected by line 18 to line 12 to supply products of combustion for raising the temperature of the reactor. Air is supplied to the chamber by line 19 and fuel by line 21. The passage of the heated inert gas is continued until the reactor and the material in the reactor has reached an elevated temperature. The purpose of this initial step is to establish in the reactor a bed of heat-storing material capable of transferring heat by convection and conduction to gaseous and solid reactant materials subsequently introduced. Since the function of the initial charge of material is purely a physical one, it would be feasible to employ any inert substance, but as previously mentioned, I prefer to use a material which is to be employed in carrying out the reaction, such as carbon.

When a suitable elevated temperature has been established in the reactor, the flow of heated flue gas through line 18 is interrupted and the solid reactants, consisting of metallic silicon, ferrosilicon or silicon carbide and carbon from hopper 6, are picked up by the screw pump on feeder 7 and discharged into line 11. Any combination of the above-mentioned ingredients may be employed which will provide the necessary amounts of silicon and carbon for the formation of the desired amounts of silicon tetrachloride and carbon bisulphide in the proper ratio. Preferably, however, I employ ferrosilicon and a form of carbon which is reactive with sulphur, such as wood charcoal which has been heated previously to remove hydrogen and oxygen. The materials are preferably in the form of particles not larger than about 50 mesh; I have found that a particle size between 100 and 200 mesh is particularly suitable.

The combined stream of material in proper proportions for the formation of silicon tetrachloride and carbon bisulphide, with no excess silicon or chlorine present, is, until its entrance into reactor 9, at a temperature too low for the commencement of the desired reactions. Upon entering the reactor 9, however, and being intimately and rapidly mixed with the preheated bed of heat-storing material, earlier described, the gaseous and solid reactants are almost instantaneously heated to at least a temperature whereat the reaction of silicon with chlorine commences. As this reaction continues, it evolves heat sufficient in quantity to superheat the sulphur vapors to a temperature such that they can react with the carbon which is also present to form carbon bisulphide.

The superheating of the sulphur vapors deserves special mention, as this is not simply a matter of sensible heat. At the boiling point, sulphur vapor is composed of sulphur molecules which are a mixture of $S_6$ and $S_8$, but when heated to the reaction temperature of approximately 1520° F., the sulphur dissociates to $S_4$ and finally to $S_2$ molecules. The dissociation of sulphur vapor from $S_8$ to $S_2$ is highly endothermic. Once the reaction between sulphur and carbon commences, a moderate quantity of heat of reaction is liberated, but this effect is entirely overshadowed by the much greater heat absorption in the dissociation of the sulphur from $S_8$ to $S_2$.

In passing through the reactor 9, the silicon and chlorine react substantially quantitatively to form silicon tetrachloride, while the sulphur introduced reacts to the extent of about 91% to form carbon bisulphide. The carbon is introduced in the stoichiometric proportion required by the quantity of sulphur which is converted to carbon bisulphide. The reactor vapors pass into the condenser 23 and the condensate and any uncondensed gases flow through line 24 into a receiver 26. The uncondensed gases pass through line 27 into a refrigerated condenser 28, wherein further liquid products are obtained and collected in the receiver 31, while the uncondensed portion is released through line 32. Liquid collected in receiver 31 is returned to separator 26 through line 30. The liquid collected in the separator 26 will include any unreacted solids such as carbon which may escape from the reactor and any ferric chloride and other impurities which are solids at the temperature of condensation of the principal products. The presence of ferric chloride may arise from the use of ferro silicon as the silicon source material. The liquid in separator 26 will consist of a mixture of silicon tetrachloride and carbon bisulphide with elementary sulphur dissolved therein.

The materials collected in receiver 26 are removed through line 25 and forced by pump 20 into line 15 and thence through filter 13 wherein the above-mentioned solids are taken out. The clarified liquid phase is then passed through line 10 into a vaporizer 33 in which, by carefully controlled heating, the volatile products are revaporized, leaving liquid sulphur to accumulate in the base of the vessel free of any substantial quantity of silicon tetrachloride or carbon bisulphide. Heat for the vaporization is supplied by heating coil 34 positioned in the bottom of the vaporizer. The liquid sulphur collected in the bottom of the vaporizer 33 is discharged through line 36 by pump 37 to the molten sulphur tank 38.

It will be appreciated that the sulphur withdrawn through line 36 constitutes that excess which is necessary to charge to reactor 9 to produce the desired amount of carbon bisulphide and that this quantity of sulphur can be continuously recycled through the process. The fresh sulphur feed is supplied through line 39 to tank 38. The total molten sulphur feed flows through line 41A to pump 42A and is charged through line 16 into the sulphur vaporizer 14.

The mixed vapors of silicon tetrachloride and carbon bisulphide pass off from vaporizer 33 through line 41 and are partially or wholly condensed in condenser 42 whence they flow through line 43 into the mid-section of fractionating column 44, which is provided with a re-boiler 46 in the base thereof. Silicon tetrachloride is removed from the base of the column through line 47 into a condenser 48 and is then passed through line 49 into a pump 51 which discharges into a silicon tetrachloride product line 52.

The carbon bisulfide is passed overhead as a vapor and is removed by line 53 through a condenser 54 and then through line 56 into a carbon bisulfide receiver 57. The liquid carbon bisulfide is removed through line 58 into a pump 59, a portion of the product leaving the pump being returned through line 61 to provide a reflux in fractionating column 44, while if desired, another portion is removed from the system through line 62. Carbon bisulfide from pump 59 is also passed through line 63 and is admitted to a chlorinator 64 into which chlorine is admitted through line 66. A vapor line 67 is provided at the top of the chlorinator 64 and is connected to a condenser 68, from which condensate flows through line 69 back to the chlorinator 64.

The chlorination of carbon bisulfide to carbon tetrachloride and sulphur monochloride is conducted at atmospheric pressure and the heat of reaction is absorbed by the vaporization of carbon tetrachloride. The amount of liquid in the chlorinator is large relative to quantity of carbon bisulphide introduced and since the chlorination reaction takes place very rapidly, it is possible by proper control of the feed to withdraw, through line 65, a stream of liquid material which is substantially entirely composed of carbon tetrachloride and sulphur monochloride and which contains only a negligible amount of unreacted carbon bisulphide. The products from the chlorinator pass through line 65 into pump 70 and are transferred through line 75 into a fractionating column 80. Carbon tetrachloride is distilled overhead through line 71 into a condenser 72, the liquified carbon tetrachloride being transferred through line 73 into a receiver 74, whence it is removed through line 76 and transferred by pump 77 partly into line 78 as reflux to column 80 and partly for removal as a product through line 79. Column 80 includes a re-boiler 81 at the base for supplying the heat required in conducting the fractionation.

The sulphur chloride collecting at the base of the column is removed through line 82 into a pump 83 which changes the sulphur chloride through line 84 to a sulphur chloride vaporizer 85; sulphur monochloride vapors from 85 pass through line 86 to the discharge of screw pump 7, and convey the solid reactants as a suspension through line 11 into line 12 and thence to reactor 9.

In the event that all or nearly all the carbon bisulphide is disposed of as such through line 62, so that only silicon tetrachloride and carbon bisulphide provide the end products, chlorine is introduced into the screw pump from line 10 instead of sulphur monochloride through line 86.

Referring now more particularly to the selection of proper operating conditions for the practice of the invention, considerable latitude is permissible, depending upon the raw materials used and upon the ratio in which silicon tetrachloride, carbon bisulphide and carbon tetrachloride are to be manufactured as end products. Ordinarily, I prefer to adjust the variables to achieve adiabatic operation of the reactor 9. This adjustment will obviously be affected by the reaction temperature and the amount of preheat supplied in vaporizer 14, vaporizer 85, and the temperature of the incoming solids.

In a typical case, where the outlet vapors from sulphur vaporizer 14 were at 850° F., the sulphur monochloride vapors from vaporizer 85 were at 285° F., and the solids were introduced at 100° F., the adiabatic operation required that about 1.4 lbs. of carbon bisulphide be produced per pound of silicon tetrachloride, the reactor temperature being about 1520° F. The above weights of products will be accompanied by about 0.1 lb. of unreacted sulphur delivered from line 36. The quantity of sulphur monochloride which must be supplied to the reactor to furnish chlorine to form each pound of silicon tetrachloride is about 1.6 lbs., and this amount will be produced by the chlorination of only 0.9 lb. of carbon bisulphide. Hence, of the total of 1.4 lbs. of carbon bisulphide produced per pound of silicon tetrachloride, 0.5 lb. will be available for disposal as such, or if desired, for chlorination to carbon tetrachloride in a separate operation. If all 1.4 lbs. of carbon bisulphide are converted to carbon tetrachloride, there will be 2.8 lbs. of the latter per pound of silicon tetrachloride. If only 0.9 lb. of carbon bisulphide are converted, there will be 1.8 lbs. of carbon tetrachloride per pound of silicon tetrachloride.

With different temperature conditions maintained in the retort and in the sulphur vaporizer and sulphur monochloride vaporizer, of course, it will be necessary to produce different weight ratios of silicon tetrachloride and carbon bisulphide for adiabatic operation. In the event that higher proportions of carbon bisulphide and/or carbon tetrachloride are desired per pound of silicon tetrachloride, then the reactants should be heated to high temperatures, or conversely, if a higher ratio of silicon tetrachloride is desired, then the reactants should be at lower temperature when they enter the reactor. This merely follows from the fact that silicon tetrachloride formation is the heat producer, while carbon bisulphide formation is the heat consumer.

If it is desired to increase the extent of silicon tetrachloride formation, liquid silicon tetrachloride can be introduced directly into the reactor at various points through line 92 from line 52 to take up heat by vaporization and so lower the degree to which dependence is placed on the production of carbon bisulfide as the heat consumer. If it is desired to maintain the silicon tetrachloride production at a relatively high level and yet not increase the carbon bisulfide production too greatly, heat can be taken up by introducing a part of the sulphur monochloride from line 84 through line 93, in liquid form, or part of the requisite amount of sulphur can be passed in liquid phase directly from line 16 through line 94 and line 92 to the reactor instead of through lines 16 and 12.

Assuming that the solid feed materials are reduced to particle sizes between 100 and 200 mesh, the superficial vapor velocity through the reactor should be between about 1 and 3 feet per second, to achieve a suitable extent of suspension therein. The heat-storing bed of carbon originally introduced is maintained by always introducing sulphur and carbon in their combining ratios, and carbon is neither added to nor removed from the mass of the original heat-storing carbon charge.

To illustrate practice of the invention, metallic silicon and carbon were placed in hopper 6 in a proportion of 28 pounds of silicon to 48 pounds of carbon. This mixture was fed by screw pump 7 into line 11 at the rate of 76 pounds per hour, 142 pounds of chlorine gas being introduced through line 10. Sulphur, vaporized in the vaporizer 14, was supplied through line 12 at the rate of 284 pounds per hour. Reactor 9 had previously been heated to a temperature of about 825° C. The mixture of metallic silicon, carbon and chlorine passed into the reactor wherein the silicon was converted to silicon tetrachloride and the carbon to carbon disulphide. A slight excess of carbon was employed initially so as to establish a light carbon bed in the reactor. The rate of introduction of the materials was so regulated that the vapor velocity in the reactor was at the average rate of 1.5 feet per second with an average theoretical retention time in the reactor of 15 seconds. The reactor was operated at 5 pounds gauge.

The reaction products passing out through line 22 included silicon tetrachloride, 168 pounds, carbon bisulphide, 304 pounds, and 28 pounds of unreacted sulphur. These materials were passed into the condenser 23 and then into receiver 26. The excess sulphur present was finally recovered through line 36 from partial condenser 33. The silicon tetrachloride was recovered through line 52 while the carbon bisulphide was taken off through line 62.

To illustrate practice of the invention wherein carbon tetrachloride comprises one of the principal products, and sulphur and chlorine are supplied by the sulphur monochloride, a mixture in the proportion of 28 pounds of silicon to 38 pounds of carbon was fed into hopper 6. This material was then discharged from screw pump 7 at the rate of 76 pounds per hour. However, 270 pounds of sulphur chloride were vaporized in sulphur monochloride vaporizer 85 and were supplied through line 86 at temperature of 140° C. In addition, 93 pounds of sulphur were supplied from a sulphur vaporizer through line 12 while no chlorine was supplied from line 10. These reactants, upon introduction into the reactor 9, produced 170 pounds of silicon tetrachloride, 239 pounds of carbon bisulphide, and 20 pounds of unreacted sulphur, the latter being recovered from the line 36 and added to the molten sulphur in the sulphur melting pot 38. The silicon tetrachloride was recovered from the first reflux column 44 through line 52 and comprised 170 pounds. The carbon bisulphide available from receiver 57 was drawn off at the rate of 87 pounds of carbon bisulphide per hour while 152 pounds per hour were diverted through line 63 into the chlorinator 64 into which chlorine was introduced at the rate of 426 pounds per hour. 308 pounds of carbon tetrachloride and 270 pounds of sulphur chloride were transferred to the second rectifying column 69 to give as a final product 308 pounds of carbon tetrachloride and 270 pounds of the sulphur monochloride which was returned through line 84 to the sulphur chloride vaporizer.

In place of diverting part of the carbon bisulphide as a product, all the carbon bisulphide can be chlorinated. However, in this instance, excess sulphur monochloride will be produced and it will be necessary to take off this from the operation instead of carbon bisulphide.

In place of using metallic silicon, one can use other silicon sources such as ferrosilicon or silicon carbide. In case other silicon sources are utilized, attention must be given to the other constituent or constituents necessarily present. Also, while I have mentioned the use of chlorine, and have indicated that the mixture added to hopper 6 comprised silicon and carbon, silicon has the ability to react with chlorine selectively and chlorinated hydrocarbons can therefore be employed. Thus, one can successfully use carbon tetrachloride, perchlorethylene or other chlorinated hydrocarbon (preferably one consisting of only carbon and chlorine) to supply a portion of the carbon and all of the chlorine required in the operation.

I claim:

1. A process for manufacture of silicon tetrachloride and carbon bisulphate comprising forming a gaseous suspension of a solid material including available silicon, available sulphur, available carbon and available chlorine, the suspension containing silicon, sulphur, carbon and chlorine substantially in the proportions required for the reaction

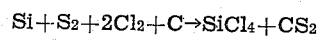
$$Si + S_2 + 2Cl_2 + C \rightarrow SiCl_4 + CS_2$$

introducing said suspension into a reaction zone wherein the silicon is chlorinated to $SiCl_4$ and the carbon is sulphurized to $CS_2$, removing the gaseous products of reaction from the reaction zone and cooling the same to liquefy the $SiCl_4$ and $CS_2$, and separating the $SiCl_4$ and $CS_2$.

2. A process for manufacture of silicon tetrachloride and carbon bisulphide comprising forming a gaseous suspension of a solid material including available silicon, available sulphur, available carbon and available chlorine, the suspension containing silicon, sulphur, carbon and chlorine substantially in the proportions required for the reaction

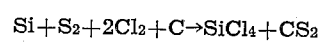
$$Si + S_2 + 2Cl_2 + C \rightarrow SiCl_4 + CS_2$$

introducing said suspension into a reaction zone wherein the silicon is chlorinated to $SiCl_4$ and the carbon is sulphurized to $CS_2$, removing the gaseous products of reaction from the reaction zone and cooling the same to liquefy the $SiCl_4$ and $CS_2$, separating the $SiCl_4$ and $CS_2$, chlorinating at least a portion of the $CS_2$ to form $CCl_4$ and $S_2Cl_2$, and returning at least a portion of the $S_2Cl_2$ to the reaction zone as a source of sulphur and chlorine.

3. A continuous process for formation of $SiCl_4$ comprising forming a gaseous suspension in a reaction zone of silicon, chlorine, carbon and sulphur, maintaining in said reaction zone a temperature conducive to formation of $SiCl_4$ and $CS_2$, the proportion of silicon, chlorine and sulphur introduced and present in said zone for reaction being at least that substantially required for reaction

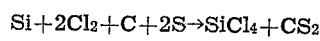
$$Si + 2Cl_2 + C + 2S \rightarrow SiCl_4 + CS_2$$

maintaining said suspension in said zone for a period sufficient to ensure substantial completion of the reaction, and recovering the $SiCl_4$ and the $CS_2$.

4. A continuous process for formation of $SiCl_4$ comprising forming a gaseous suspension in a reaction zone of silicon, chlorine, carbon and sulphur, maintaining in said reaction zone a temperature conducive to formation of $SiCl_4$ and $CS_2$, the proportion of silicon, chlorine and sulphur introduced and present in said zone for reaction being at least that substantially required for reaction $$Si + 2Cl_2 + C + 2S \rightarrow SiCl_4 + CS_2$$

maintaining said suspension in said zone for a period sufficient to ensure substantial completion of the reaction, recovering and separating the $SiCl_4$ and the $CS_2$, reacting at least a portion of the separated $CS_2$ with chlorine to form carbon tetrachloride and a sulphur chloride, separating the sulphur chloride and returning to the reaction zone at least a portion of the sulphur chloride as a source of sulphur and of chlorine.

5. A continuous process for formation of $SiCl_4$ and $CS_2$ comprising simultaneously (a) chlorinating silicon to form $SiCl_4$ and (b) sulphidizing carbon to form $CS_2$ in a common reaction zone, removing products of reaction from said zone and recovering the $SiCl_4$ and the $CS_2$, the quantity of $SiCl_4$ formed in said reaction zone being sufficient to maintain said zone at a temperature conducive to formation of $CS_2$ without external heating of said zone.

6. A continuous process for formation of $SiCl_4$ and $CS_2$ comprising simultaneously (a) chlorinating silicon to form $SiCl_4$ and (b) sulphidizing carbon to form $CS_2$ in a common reaction zone, removing products of reaction from said zone and recovering the $SiCl_4$ and the $CS_2$, the quantity of $SiCl_4$ formed in said reaction zone being sufficient to maintain said zone at a temperature conducive to formation of $CS_2$ without external heating of said zone, chlorinating at least a portion of the $CS_2$ to $CCl_4$ and $S_2Cl_2$, and returning at least some of the $S_2Cl_2$ to said zone as a source of sulphur and of chlorine.

7. A continuous process for formation of $SiCl_4$ and $CS_2$ comprising simultaneously (a) chlorinating silicon to form $SiCl_4$ and (b) sulphidizing carbon to form $CS_2$ in a common reaction zone, removing products of reaction from said zone and recovering the $SiCl_4$ and the $CS_2$, the quantities of $SiCl_4$ and of $CS_2$ formed in said zone each being such that said zone is maintained under substantially adiabatic conditions and at a temperature conducive to formation of $SiCl_4$ and $CS_2$.

8. A continuous process for formation of $SiCl_4$ and $CS_2$ comprising simultaneously (a) chlorinating silicon to form $SiCl_4$ and (b) sulphidizing carbon to form $CS_2$ in a common reaction zone, removing products of reaction from said zone and recovering the $SiCl_4$ and the $CS_2$, the quantity of $CS_2$ formed in said zone being sufficient to take up heat liberated upon formation of said $SiCl_4$ and to maintain the reaction zone at a temperature conducive to formation of both $CS_2$ and $SiCl_4$.

ARNOLD BELCHETZ.